INVENTOR
JOHANNES VAN DER STER
ALDERT T. BLOEM
BY
Frank R. Trifari
AGENT

Nov. 30, 1965 J. VAN DER STER ETAL 3,220,167
ARRANGEMENT FOR SEPARATING IN A SOLID STATE
CONSTITUENTS FROM A GAS MIXTURE
Filed May 5, 1961 2 Sheets-Sheet 2

INVENTOR
JOHANNES VAN DER STER.
ALDERT TEUNIS BLOEM

United States Patent Office 3,220,167
Patented Nov. 30, 1965

3,220,167
ARRANGEMENT FOR SEPARATING IN A SOLID STATE CONSTITUENTS FROM A GAS MIXTURE
Johannes van der Ster and Aldert Teunis Bloem, Emmasingel, Eindhoven, Netherlands, assignors to North American Philips Company, Inc., New York, N.Y., a corporation of Delaware
Filed May 5, 1961, Ser. No. 108,100
Claims priority, application Netherlands, May 7, 1960, 251,342
2 Claims. (Cl. 55—269)

The invention relates to an arrangement for separating in a solid state constituents from a gas mixture by means of cooling.

It is often desirable, for example in air-fractionating systems and in cold gas refrigerators which are capable of condensing gas on their freezer heads and of assuming a very low temperature, to free the supplied gas mixture before its fractionation or condensation from constituents, such as water vapour and carbon dioxide, which, when cooled, are separated out in the form of ice or snow at much higher temperatures than those at which the fractionation or condensation takes place. These component may be troublesome because they may block the ducts, such as those in the heat exchangers, or may contaminate the condensate, which, for example in liquefied air, becomes manifest in undesirable turbidity.

For this above-noted purpose, several arrangements have already been developed.

For example, an arrangement is known for separating in a solid state components from a gas mixture by means of cooling in which a support permitting gas to pass, such as a gauze partition, is arranged in the flow of the gas mixture. This support is connected with a cooling device so that the components are deposited on the support in the form of snow.

It is possible with such an arrangement to build up a constantly-growing layer of snow on the gauze in a direction opposite to the direction of flow of the gas to be purified, which layer remains so porous that even at a fairly considerable thickness, the resistance to the flow of gas through the layer of snow remains below a reasonable value. The components to be separated out are then not only deposited on the layer of snow, but also in the layer, however, without immediately obstructing the latter.

However, the said possibility appears to exist only when the partition allowing gas to pass, which hereinafter is termed gauze, is satisfactorily cooled. A continuous transport of cold therefore takes place between a source of cold different from the gas itself and the gauze in a manner such that also in the layer of snow throughout its thickness a temperature gradient is constantly maintained.

In such a separator, the following phenomenon now occurs. When a layer of snow has already been formed, all carbon dioxide is deposited in the snow in close proximity to the gauze. Then ultimately, the resistance of this layer which has a thickness of only a few millimeters, determines the loadability of the gauze.

The invention has for its object to provide a solution for these difficulties.

According to the invention, a layer is arranged on the support which has properties similar to those of coarse snow separated out on the gauze, or the support itself consists of such a layer.

The layer may consist, for example, of
(1) a plurality of gauze layers which are wound loosely around the snow-collecting gauze proper;
(2) a gauze coarser than the snow-collecting gauze proper, which is at a certain distance from the latter;
(3) a layer of felt, for example of glass wool or regenerator filler consisting of wire;
(4) a material from which pan sponge is manufactured;
(5) a metal velvet;
(6) a tissue, such as glass cloth.

Particularly favorable results have been obtained with a gauze layer of a zigzag structure.

It is also possible to use a layer which is obtained by winding a gauze strip.

When applying the invention, a depth effect is obtained in front of the gauze, that is to say before the supplied gas has passed the gauze. The supplied gas is pre-cooled before the gauze proper is reached. Then initially, fairly coarse snow crystals prove to be formed on the gauze proper, which crystals have a greater space between them for storing snow subsequently formed. It is of advantage that a heavy fog is not produced in the supplied gas because the gas does not immediately come into contact with extremely cold parts of the support. This might lead to a rapid blocking of the gauze proper. The cold of those parts is, so to say, smeared out by the presence of the layer according to the invention. Moreover, the formation of snow is more rapidly initiated by the presence of this layer.

The invention will be explained more fully with reference to the drawing.

Figure 1:
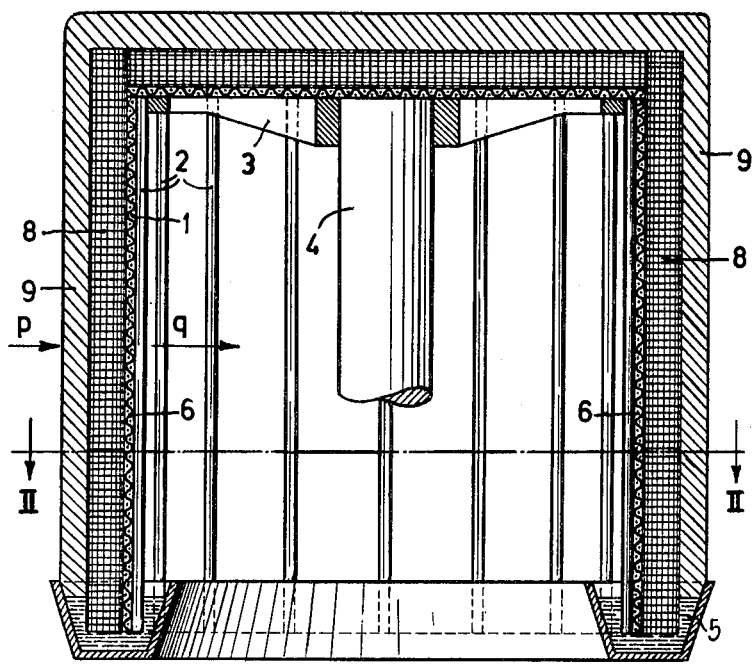
FIG. 1 shows diagrammatically a longitudinal section of a separator according to the invention.

As shown in FIG. 1, a gauze cage 6 surrounds a heat-conducting support structure including good conducting rods 2 which at their upper ends are connected to a good conducting block 3 which in its turn is connected, for example by means of a rod or bolt 4, to a source of cold, such as a cold head of a cold gas refrigerator (not shown). Moreover, the cage includes a gauze layer 1 which is cooled by immersing its lower edge into a bath 5 of liquid gas.

The gas to be purified is supplied in the direction of the arrows $p$ and is conducted away in the direction of the arrows $q$ to an outlet (not shown).

All this is known from the U.S. Patent No. 2,999,364. In this patent, data is also given about the mesh size of the gauze and the desired velocity of the flow of gas.

According to the invention, the gauze 1 which is in general a partition allowing gas to pass has a structure such that properties are obtained similar to those of coarse or heavy snow separated out on the gauze. This is achieved, for example, by providing the gauze 1 with a special layer.

The drawing shows two constructions of such a layer.

Figure 3:
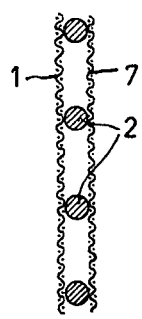
FIG. 3 shows part of the gauze with an auxiliary gauze connected to it.

As shown in FIG. 3, on the gauze layer 1 a wire is arranged having excellent heat-conducting properties, such as copper, having a thickness of, for example, 3 mms., which wire holds a layer 7 of coarser gauze spaced apart from the gauze 1. The mesh size of the coarse gauze is, for example, about twice that of the gauze 1.

In the space between the gauzes 1 and 7, in particular carbon dioxide is collected when air is supplied. First a layer of snow is built up having a fairly coarse structure.

Optimum results have been obtained by winding round the gauze 1 a gauze 8 shaped into a zigzag form (FIGS.

2 and 4). This may likewise be coarse gauze having a mesh size of, for example, 4 mms.

In this construction, the layer of snow especially grows on the outer side of the zigzag-shaped gauze. In the zigzag-shaped gauze a larger space remains for the deposition of the carbon dioxide so that its resistance remains low and the gauze may be loaded much more heavily than without the application of the zigzag-shaped gauze. The temperature limit at which carbon dioxide begins to deposit, which limit proves to lie at −143° C., is transferred to the outer side by convection through the gauze.

A particular advantage is that the free convection current decreases and that the condensate of the gas mixture conducted through the gauze becomes more rapidly clean during the starting period when the layer of snow is built up.

Instead of using this gauze shaped into zigzag form, use may also be made of a layer which is constituted by winding a band or strip of gauze. The centre line of the roll may then be at right angles to the plane of the support when the support has a flat surface.

Figure 2:
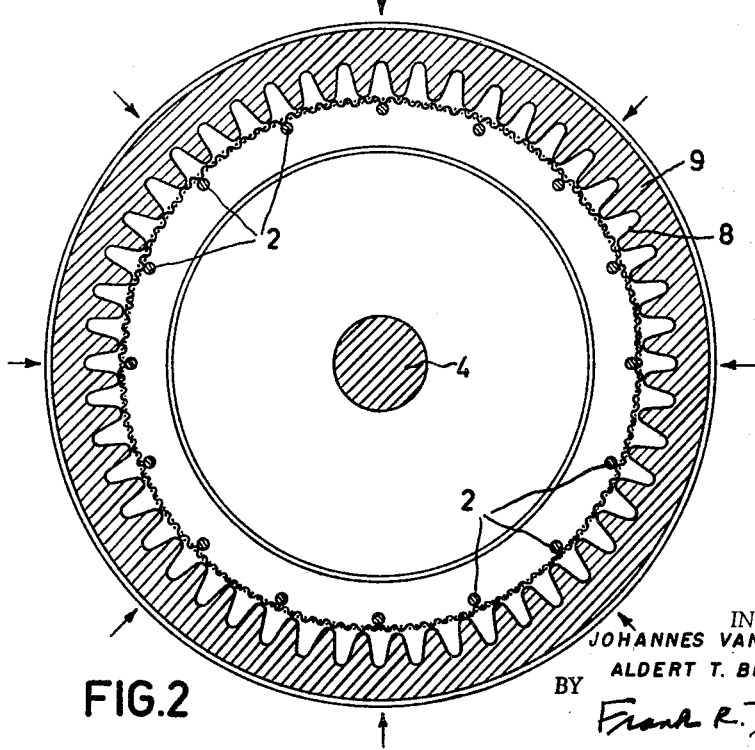
FIG. 2 is taken on the lines II—II in FIG. 1.
Figure 4:
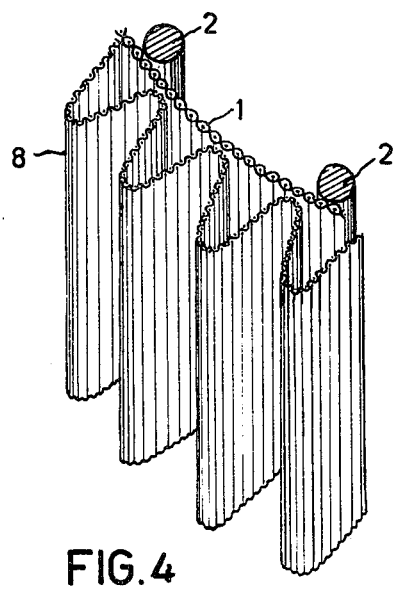
FIG. 4 illustrates part of a gauze provided with a gauze of zigzag structure which constitutes the layer according to the invention.

The operating time of a separator with such a gauze 8, that is to say the time until removal of the formed layer of snow 9 (FIG. 2) is necessary because, for example, the resistance to flow of the layer has become too large, is found to be very long.

What is claimed is:
1. A device for separating out impurities in a solid state from a gas mixture comprising:
   (a) a heat-conducting support structure including
      (1) a central heat-conducting rod-like member having one end adapted to be connected to a source of cold,
      (2) heat-conducting means connected to and extending radially outwardly from the other end of said rod-like member,
      (3) a plurality of heat-conducting rods surrounding said rod-like member in spaced generally parallel relationship therewith, each of said rods having one end connected to said heat-conducting means, said rods being spaced around the periphery of said heat-conducting means;
   (b) a first gas permeable gauze layer closely surrounding and in contact with the exterior of said heat-conducting support structure;
   (c) a second gas permeable gauze layer folded in zigzag form and closely surrounding said first gauze layer, each of said gauze layers having openings therethrough with the openings in said second layer being wider than the openings in said first layer; and
   (d) means forming a bath of liquid gas, said gas permeable gauze layers and the other ends of said rods extending into said bath, whereby, when said rod-like member is connected to a source of cold and a gas mixture is passed through said second gauze layer and said first gauze layer in succession, the impurities in the gas mixture will be solidified and deposited in a constantly increasing layer of snow on said gauze layers in a direction opposite to the direction of the flow of said gas mixture.

2. A device for separating out impurities in a solid state from a gas mixture as claimed in claim 1 wherein each of said openings in said second gas permeable gauze layer is about 4 mms. in diameter.

References Cited by the Examiner
UNITED STATES PATENTS

| | | | |
|---|---|---|---|
| 209,505 | 10/1878 | Otten et al. | 261—107 X |
| 801,044 | 10/1905 | Parsons | 261—107 |
| 1,697,600 | 1/1929 | Jack. | |
| 1,734,274 | 11/1929 | Schubart. | |
| 1,860,111 | 5/1932 | Miller | 261—107 X |
| 1,873,418 | 8/1932 | Jones | 62—15 |
| 2,021,452 | 11/1935 | Kuenzli et al. | 62—474 X |
| 2,084,403 | 6/1937 | Maiuri | 62—10 |
| 2,112,743 | 3/1938 | Poole. | |
| 2,698,061 | 12/1954 | Jaubert | 55—323 X |
| 2,705,405 | 4/1955 | Uhlman | 62—474 |
| 2,999,364 | 9/1961 | Hillingman | 62—6 |

ROBERT F. BURNETT, *Primary Examiner.*

HARRY B. THORNTON, HERBERT L. MARTIN, ROBERT A. O'LEARY, *Examiners.*